US 6,646,724 B2

(12) United States Patent
Benz et al.

(10) Patent No.: US 6,646,724 B2
(45) Date of Patent: Nov. 11, 2003

(54) DEVICE FOR DETERMINING THE INFLUENCE OF DISPERSION ON A MEASUREMENT

(75) Inventors: Paul Benz, Diepoldsau (CH); Jürg Hinderling, Marbach (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/122,378

(22) Filed: Apr. 16, 2002

(65) Prior Publication Data
US 2002/0180951 A1 Dec. 5, 2002

(30) Foreign Application Priority Data
Apr. 18, 2001 (CH) .............................................. 0706/01

(51) Int. Cl.[7] .............................. G01C 3/08; G01J 3/40; G01J 3/42
(52) U.S. Cl. ..................... 356/5.01; 356/4.01; 356/320; 356/302
(58) Field of Search ............... 356/4.01–5.15, 356/51, 302, 320, 319, 323

(56) References Cited

U.S. PATENT DOCUMENTS

| 5,233,176 A | 8/1993 | Veligdan |
| 5,306,662 A | 4/1994 | Nakamura et al. |
| 5,307,138 A | * 4/1994 | Weindling ................. 356/5.09 |
| 5,578,839 A | 11/1996 | Nakamura et al. |
| 5,747,832 A | 5/1998 | Nakamura et al. |
| 5,767,581 A | 6/1998 | Nakamura et al. |

FOREIGN PATENT DOCUMENTS

JP 03191837 A * 8/1991 ............. G01J/1/44

* cited by examiner

Primary Examiner—Thomas H. Tarcza
Assistant Examiner—Brian Andrea
(74) Attorney, Agent, or Firm—Oliff & Berridge PLC

(57) ABSTRACT

A device determines and subsequently corrects the dispersive influence on a measurement made according to the principles of phase or pulse modulation along a visible range. The device has an element for emission of electromagnetic radiation with two carrier wavelengths in the border regions of the visible spectrum. After passing through a volume of atmosphere to be probed, and reflection, the radiation is received and the dispersive influence, for instance, on the distance measurements, is calculated and corrected.

12 Claims, 4 Drawing Sheets

DEVICE FOR DETERMINING THE INFLUENCE OF DISPERSION ON A MEASUREMENT

BACKGROUND OF THE INVENTION

The invention concerns a device for determining the influence of dispersion on a distance measurement by the principles of phase or pulse modulation according to the preamble of claim 1, as well as a use of the device for correcting distance measurements for the influence of dispersion according to claim 1 and a geodetical instrument according to claim 12.

In almost all electronic distance mesauring (EDM) devices, the influence of atmospheric parameters is added after the distance measurement properly speaking, in terms of a distance correction obtained in a calculation step. The pertinent atmospheric parameters are measured, not with the distance meter itself but with other, separate instruments such as thermometers, barometers, and hygrometers.

The rate of propagation of an optical pulse emitted in electro-optic distance measurements, or of a signal train modulated in whatever way, is determined by the group refractive index n. Here the refractive index and the group refractive index depend primarily on wavelength, temperature, atmospheric pressure, the gas mixture and humidity of the prevalent atmosphere, rather than being constant quantities.

A direct range reading $D_0$ as measured and displayed by the electronic distance meter (EDM) (the raw measurement) refers to a particular group refractive index $n_0$. The true group index $n=(T, p, RH, \ldots)$ can be calculated with the aid of the meteorological parameters of temperature T, atmospheric pressure p, and relative humidity RH. Using a so-called atmospheric correction $$\Delta D = D_0 \cdot \left(\frac{n_0 - n}{n}\right) \quad (1)$$

the true distance D can be determined:

$$D = D_0 + \Delta D. \quad (2)$$

Using this atmospheric "post processing" procedure one can attain distance measuring precisions attaining 1 ppm, but the raw distance $D_0$ that is read can easily deviate from the true value by 30 ppm or more when temperature T and atmospheric pressure p are not known or not representative over the full optical path.

When the distances are longer and then often cover a nonuniform topography, then it becomes doubtful that the effective group refractive indices can be determined reliably from meteorological data applicable at the two extreme points of the range. Attempts to determine such data along the way have not been successful so far.

In geodesy an economic distance meter is desirable which can automatically and rapidly correct for the influence of the atmospheric refractive index. At distances in the range between 100 m and several km this index has a decisive influence on the results of electro-optical distance measurements. This is true, both for electro-optical distance meters based on phase measurements and for distance meters based on travel time measurements. Correcting automatically for the influence of atmospheric refraction one could considerably reduce the time and instrumental requirements in precision measurements involving long distances.

One of the basic ideas is that of utilizing the spectroscopically wide-band dispersion, by measuring the distance with light or electromagnetic radiation having two different wavelengths. This two-color or multicolor procedure has been known since about 1975. When measuring the distance simultaneously with at least two different electromagnetic wavelengths, either optical or in the microwave range, and accounting for the known, spectroscopically wide-band dispersive behavior of the atmosphere, one can determine the most important atmospheric interference parameter(s), and thus substantially correct the distance value for the influence of the group refractive index, which as a rule is not precisely known.

Pertinent theories rely on the spectroscopically wide-band formulas of Edlen and of Barrel & Sears. (Ref. Rainer Joeckel, Manfred Stober: Elektronische Entfernungs-und Richtungsmessung [Electronic distance and direction measurements], Konrad Wittwer Publishers).

The resulting distance values from the two carrier wavelengths are $D_r$ and $D_b$, the corresponding refractive indices are n, und $n_b$. The true distance is obtained from the following relation for distance correction:

$$D = D_r - (D_b - D_r) \cdot \left(\frac{n_r - 1}{n_b - n_r}\right). \quad (3)$$

The actual difficulty of this two-color method, which relies on the model of the spectrocopically wide-band formula, is related to the resolution and precision needed in determining the difference of distances $(D_b - D_r)$.

The model parameter $$Q = \left(\frac{n_r - 1}{(n_b - n_r)}\right) \quad (4)$$

becomes smaller and more favorable the further apart the two carrier wavelengths. The model parameter is very large, and with it the error of distance correction, when the two carrier wavelengths are not sufficiently far apart.

The current limit of precision that can be attained in measurements of optical signals is known to be around 1%, the main factor influencing the signal measuring errors being the atmospheric turbulence. Since the influence of resolution is independent of the distance, this kind of two-color instrument will be potentially superior to single-color instruments at distances well beyond 2 km.

Known two-color instruments are for instance the Goran I from National Physical Laboratory (Teddington/UK) with $\lambda_b$=458nm and $\lambda_g$=514 nm and the large value of Q=57. For a distance error of 1 mm, the resolution needed is then 0.02 mm. This can only be realized, if at all, with very substantial input, hence this method has so far not become accepted. So far no commercial instruments are in use, and installations built up to now are very expensive and occupy the surface area of a lab bench.

From the patent document U.S. Pat. No. 5,233,176, a device using the two-color method is known which compensates the results for the influence of atmospheric effects by evaluating the departure of two laser beams having different wavelengths from corresponding reference beam pathways. Laser light is emitted in short pulses with two different carrier wave-lengths. From the dispersive shift of the two pathways from a straight line, the dispersive influence is deduced and the results corrected.

It is a considerable drawback of known devices with two or three carrier wavelengths that they utilize the small variations in wide-band optical dispersion resulting from two closely spaced carrier wavelengths. In doing so they follow the wide-band models of Barrel & Sears or the relations of Edlen. The main drawback is the small size of the quantity measured, which provides an inaccurate distance correction inferior in its quality to the classical atmospheric correction involving a determination of the meteorological parameters T, p, and RH. According to the models of Barrel & Sears or the relations of Edlen, the difference in group refraction of the atmosphere between red (e.g., 635 =m) and near infrared (e.g., 820 nm) is very small (about 5 ppm).

One thus can summarize the essential drawbacks of all hitherton existing instruments with two or three carrier wavelengths, as follows:

(i) Using carrier wavelengths having little separation leads to a very small difference in optical dispersion.

(ii) This leads to the need for an extremely high resolution which in the prior art cannot be realized under field conditions.

(iii) The alternative of using carrier wavelengths that are widely spaced, according to the prior art requires a high instrumental effort inasmuch as the requirements for controls, switching, etc. are different between the two wave-length regions.

(iv) The instruments to be realized when using carrier wavelengths that are widely spaced do not meet the requirements of surveying technology, especially so with respect to their weight and ruggedness.

SUMMARY OF THE INVENTION

It is a technical object of the present invention to provide a geodetic device, fit for field measurements of dispersion over a visible range of distances using a multi-color method requiring lower resolution for a given distance error or yielding a smaller distance error for a given, attainable resolution than devices of the prior art.

It is a further object to provide a device based on phase measurements yielding distance values corrected for the dispersive influence.

It is a further task to simplify the technical prerequisites for the emission of electromagnetic radiation for multicolor measurements involving a larger wavelength difference.

It is a further task to provide a device for multicolor measurements involving a large wavelength difference utilizing optics in common with a visual telescope.

These objects are attained according to the invention by the characterizing features of claim 1 or the dependent claims. A use of the device follows from claim 11, a theodolite follows from claim 12. Advantageous and alternative embodiments and extensions become evident from the features of the dependent claims.

The basic idea of the invention is that of supplementing the measurements in the infrared or red region (850 nm or 780 nm) with measurements in the blue-violet or violet region (440 nm or 405 nm). Light in the blue-violet or violet region is subject to a strong effect of atmospheric refraction, hence an improved atmospheric correction becomes possible. The difference in atmospheric group refraction index is about 25 ppm in the violet region, for instance, while factor Q is about 10, so that the demands on the accuracy of single-color measurements are much lower than in methods of the prior art.

Power-saving, economic semiconductor lasers to be used as sources of radiation in the blue-violet and violet region of the spectrum provide the basis for implementing instruments for a compact solution suitable for practical geodesic uses. Lasers emitting in this region of the spectrum, or the semiconductor materials on which they are based, are known for instance from the patent documents U.S. Pat. No. 5,306,662, U.S. Pat. No. 5,578,839, U.S. Pat. No. 5,747,832, and U.S. Pat. No. 5,767,581.

Blue-violet or violet laser diodes have an accuracy superior to that of blue laser diodes. A potential use of UV laser diodes (<400 nm) is no longer advantageous, since their radiation is strongly attenuated by increasing atmospheric scattering. Because of Rayleigh scattering, the scattering coefficient of air increases with the fourth power with decreasing wavelength.

For the region at the long-wave end of the visible spectrum, laser diodes are commercially available and sensitive semiconductor detectors exist, thus economic solutions can be realized.

For instance, a distance meter can be fitted with an infrared semiconductor laser having a wavelength of $\lambda_{IR}$=850 nm as well as with a violet semiconductor laser having a wavelength of $\lambda_v$=405 nm, where suffixes IR and V signify infrared and violet, respectively. The required measurement of distance can occur with both lasers at the same time, or consecutively.

The difference between the two distance readings is about 25 ppm, that is, for a distance of 1 km the violet laser yields a value about 25 mm farther than the infrared laser. However, the range difference $D_V-D_{IR}$ will vary depending on the current group refractive index of air (as a function of temperature, atmospheric pressure, humidity, C02 content etc.).

The true distance can be calculated while allowing for (3), according to $$D = D_{IR} - (D_V - D_{IR}) \cdot \left(\frac{n_{IR} - 1}{n_V - n_{IR}}\right). \tag{5}$$

Using wavelengths of $\lambda_v$=405 n und $\lambda_{IR}$=850 nm one finds $$D = D_{IR} - (D_V - D_{IR}) \cdot \left(\frac{1.002945 - 1}{1.000320 - 1.0002945}\right) = \tag{6}$$

$$D_{IR} - (D_V - D_{IR}) \cdot 11.54902.$$

Thus, for making the correction one multiplies the distance difference with the factor of 11.549, which implies that the individual distances must be determined more accurately by a factor of 11.549·√2 than the accuracy desired for the final result. For instance, for a desired absolute acuracy of 3 mm the single-color distances must be determined relative to each other with an accuracy of −0.2 mm.

A very precise, known measuring procedure based on the so-called Fizeau principle is that of the Mekometer (J. M. R üeger: Electronic Distance Measurement, 4th edition, Springer Publishers, 1996), where the laser beam to be emitted is modulated with an electro-optic modulator (a Kerr cell) in the MHz to GHz range, while the received beam is demodulated with the same modulator in a phase-coherent way. Particularly because of the high frequencies involved, this method of external modulation yields an extremely high accuracy in distance measurements, but is rather less suitable for ergonomic instruments of small volume fit for field measurements.

The objective of distance measurements with laser diodes which are to be accurate to <0.2 mm calls for another technical solution. That of directly modulating the current with a high frequency is not appropriate in the case of laser diodes, since it does not yield the required measuring acuracy.

The required accuracies in the sub-millimeter range can be attained, to the contrary, when the intensity of laser diodes is modulated directly by electronic control circuits, so that the optical rise and decay times are if possible comparable to 1 nanosecond or less.

The accuracy of an individual distance reading then depends on the wave front of the signal or phase fluctuation during emission. A modulation of intensity of the carrier wave-length or an excitation of the laser diodes for the emission of pulses having a pulse width of less than 2 nano-seconds offers the advantage of smaller phase fluctuations, since the radiative modes of the laser diode are forced to emit in phase, while interference from coherent radiation characteristics are suppressed as well. A device having this characteristic is known from patent documents EP-0,701,702 and EP-0,738,899.

The use of carrier wavelengths in the blue-violet or violet region requires pulse widths or rise times preferably in the picosecond range, since the energy differences between the levels of the lasers are larger than in lasers of longer wavelengths, while the lifetime of states in a laser level is negatively correlated, for instance with the energy difference of the levels and of the radiation to be emitted in the transition. In such short pulses a higher power and a homogeneous emission can be attained.

The exclusive use of wavelenghts in the visible region (ca. 700 nm to 400 nm) or of wavelengths in the border regions of the visible spectrum is advantageous in terms of laser safety, since such lasers are in the laser class 2 authorizing higher power levels. Moreover, a visible light spot produced by the laser on the object to be surveyed provides a simple way of positioning the light spot.

With wavelengths in the border region rather than in the middle of the visible part of the spectrum, it is then possible to use optics in common with a visual telescope, and the theodolite telescope will not provide a tinted image, while if a green laser was used, for instance, the image in the telescope would appear tinted to the eye.

Common optics have the further advantage to economize volume, particularly in the case of radiometric optical systems having a receiver aperture as large as possible. Moreover, the two coaxially arranged carrier waves travel through precisely the same air volume, so the distance difference comes about through dispersion exclusively, while other interferences cannot occur.

An advantage on the receiver side arises when using common optics, and the same receiver (photodiode, rf amplifier, demodulator), so that possible drifts will mutually cancel. In devices existing up to now, which because of the different laser systems employ different modulation procedures, separate receiver systems are required. Moreover, because of the smaller wavelength difference present in these devices, the individual distances must be measured rather more accurately, which may lead to either a long measuring time or a smaller range of action.

The use according to the invention, of wavelengths wide apart by comparison, not only has the advantage that the more strongly dispersive behavior of the atmosphere can be used in a better way to determine the refractive index but also, that the visual telescope channel is not adversely affected.

Using a common objective for both the visual telescope and the two carrier wavelengths in the border region of the visible spectrum, is associated with special optical requirements. On one hand the optical imaging quality and particularly so the sharpness of the image must be secured, on the other hand the image intercepts must be identical for the two wavelengths if both carrier waves are imaged on the same receiver diode. This difficult task can be tackled with an objective consisting of a mere three lenses when an optimum selection is made for the glass qualities of the lenses.

For identical dimensions of the image intercepts at 400 nm and 780 nm, for instance, one uses suitable glass qualities in order to move the curve of chromatic focal shift which is parabolic as a function of wavelength to the correct spectroscopic position. The image intercepts for the two carrier wavelengths are now identical without a deterioration of image quality in the visual part of the spectrum.

Using optics having reflective elements which exhibit an achromatic behavior, one has the possibility of receiving and imaging beams having different wavelengths with the same optics, but systems with mirror elements generally are more expensive and more demanding as to the surface quality of the optically active surfaces.

Using two semiconductor lasers as the radiation sources one can attain a small structural size of the device for dispersion correction, which thus can be integrated without difficulties into a theodolite, and be used there for an automatic elimination of dispersive errors in distance measurements. For their use in a theodolite, the low power consumption of the semiconductor lasers is an advantage, since the normal power supply is by batteries. The use of the device according to the invention in a theodolite is described here, merely as an example for a geodetic instrument. Basically, this device can be utilized in any appropriate geodetic instrument.

Further design advantages arise for the device according to the invention. In the device according to the invention, the second light source is also a laser diode or LED which in its response to the electronic controls corresponds to the distance meter's first light source. Thus, technically simple realizations of the two-color process become possible, since merely a duplication is required, in particular, for the pathway of the emitted beam and for the electronic controls. The common pathway for the emitted beams implies that an approximately identical volume of the atmosphere is probed by the two coaxial wavelengths.

When using an infrared and a violet semiconductor laser, the same type of modulation (amplitude modulation) can be used for both lasers. This leads to a simpler adjustment of luminous power and a simpler electronic controller, since direct current modulation can be employed. In view of this direct modulation an external modulator which has drawbacks both with respect to its price and complexity and with respect to its space requirements, is not needed.

The semiconductor lasers that can be used according to the invention have dimensions which are orders of magnitude smaller than those of the gas or solid-state lasers used up to now in two-color range finders, which in most cases were operated with an external polarization modulator. The energy or power consumption is lower by a factor of 10 to 100, and expensive and complicated modulator controls are no longer required. Moreover, in view of the direct emission of laser light having different carrier wave-lengths, a frequency doubling or tripling of the laser light with a nonlinear crystal is not necessary.

In view of the stronger dependence of the refractive index on wavelenght in the region of short wavelengths, it will be advantagous to stabilize the blue-violet or violet radiation source with respect to its wavelength. This can be achieved with generally known procedures, such as distributed feedback, distributed Bragg reflection, fibre Bragg grating, or Fabry-Perot etalon locking.

Possiblities to account for temperature-dependent drift of the laser exist in terms of its simulation and subsequent correction by calculation, or by its direct suppression with cooling or heating of the laser. The possibility of correction by calculation is based on the unique dependence of wavelength on laser temperature which exists in the blue-violet and violet region of wavelengths. Violet laser diodes, for instance, have a thermal wavelength drift of typically 0.05 nm/° C., which is distinctly smaller than that of longer wavelength laser diodes, hence the need for a compensation or correction is smaller than with other laser types. Using a temperature sensor placed directly on the laser diode one can determine the wavelength to 0.05 nm accuracy, and eliminate the influence on the dispersive effect with the needed precision by calculation.

The drift can also be avoided directly or reduced, as an alternative or in addition, by using cooling or heating of the laser, for instance with a Peltier element.

In view of the advantages that were described, with respect to the optics and electronics used, the mechanical dimensions attainable, and the energy or current consumption, the device according to the invention will allow two-color distance measurements to be integrated into a geodetic instrument such as for instance a tachymat.

BRIEF DESCRIPTION OF THE DRAWINGS

The device according to the invention and, in the instance of a theodolite, an instrument according to the invention will in the following be described purely as examples in greater detail with the aid of embodiments presented schematically in the drawing. Individually.

DETAILED DESCRIPTION OF THE PREFERRED EMBODIMENT

Figure 1:
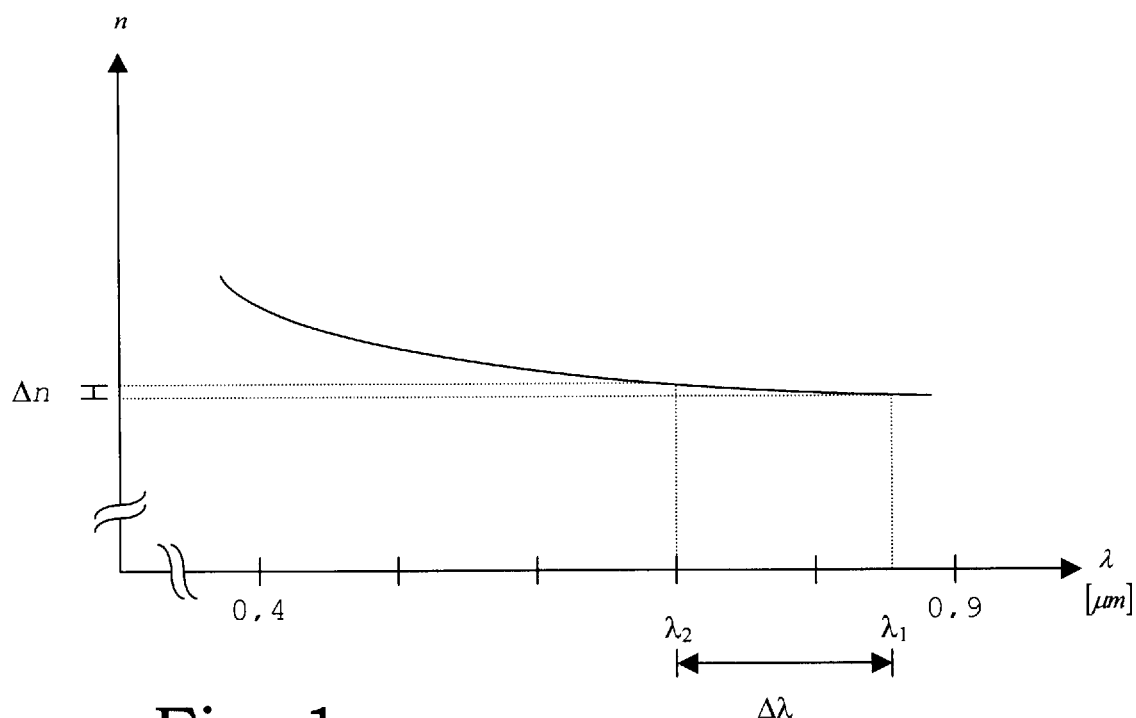
FIG. 1 shows the physical conditions for a two-color method of the prior art.

FIG. 1 shows a utilization of dispersion for a two-color method of the prior art where two carrier wavelengths $\lambda_1$ and $\lambda_2$ are used which probe volumes of the atmosphere in the red region of the spectrum at 700 nm and in the infrared region of the spectrum at 850 =m. Wavelength $\lambda$ is plotted on the horizontal axis, while the refractive index n is plotted on the vertical axis. As the precision of the dispersive correction demands a difference between the refractive indices covered by the measurements that is as large as possible, two carrier wavelengths must be selected in view of the wavelength dependence of the refractive index which are far apart, i.e., the difference $\Delta\lambda$ of the carrier wavelengths $\lambda_1$ and $\lambda_2$ is maximized. According to the prior art, this is done by shifting one of the wavelengths into the infrared region.

Figure 2:
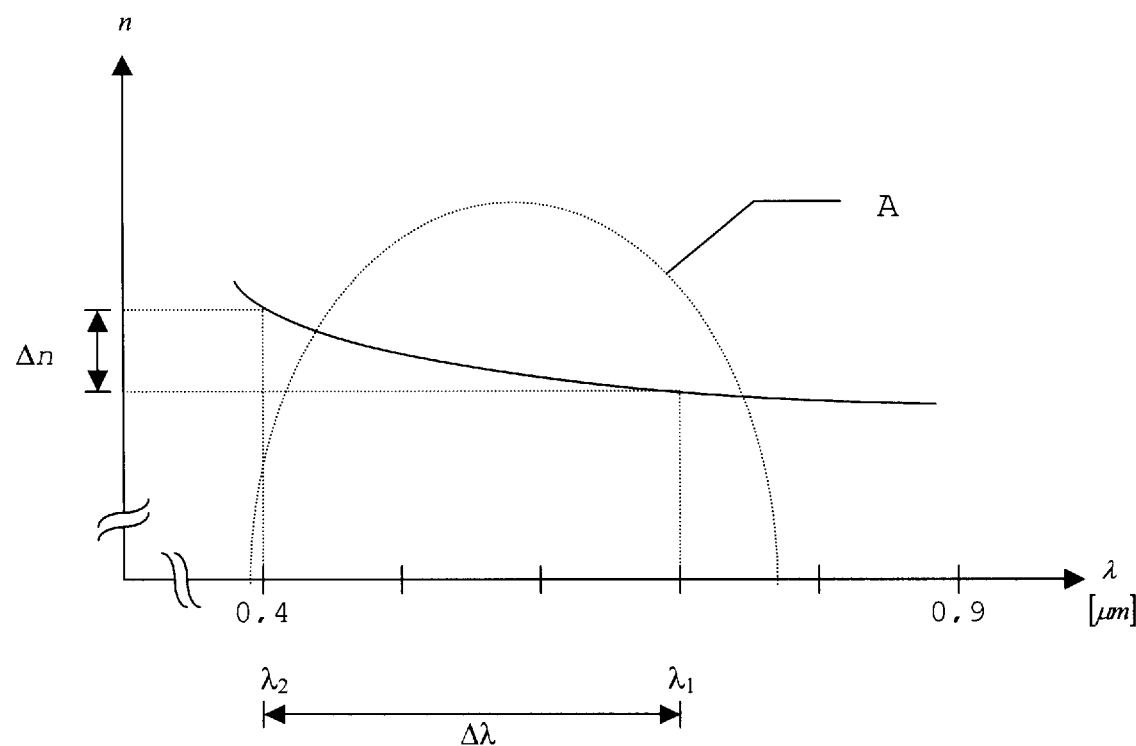
FIG. 2 shows the physical conditions for a two-color method in a device according to the invention.

FIG. 2 shows the physical conditions for a two-color method in a device according to the invention. Wavelength $\lambda$ is again plotted on the horizontal axis while the refractive index n is plotted on the vertical axis. The wave lengths used, of $\lambda_1$ and $\lambda_2$, are now in the violet region at 405 nm and in the red region at 700 nm. This implies that while there is a larger wavelength difference, both wavelengths can be located in the visible region. Moreover, the difference $\Delta n$ of the refractive indices is reinforced by the steep rise of the refractive index at the short-wave end of the spectrum. Curve A schematically shows the brightness sensitivity of the human eye.

Figure 3:
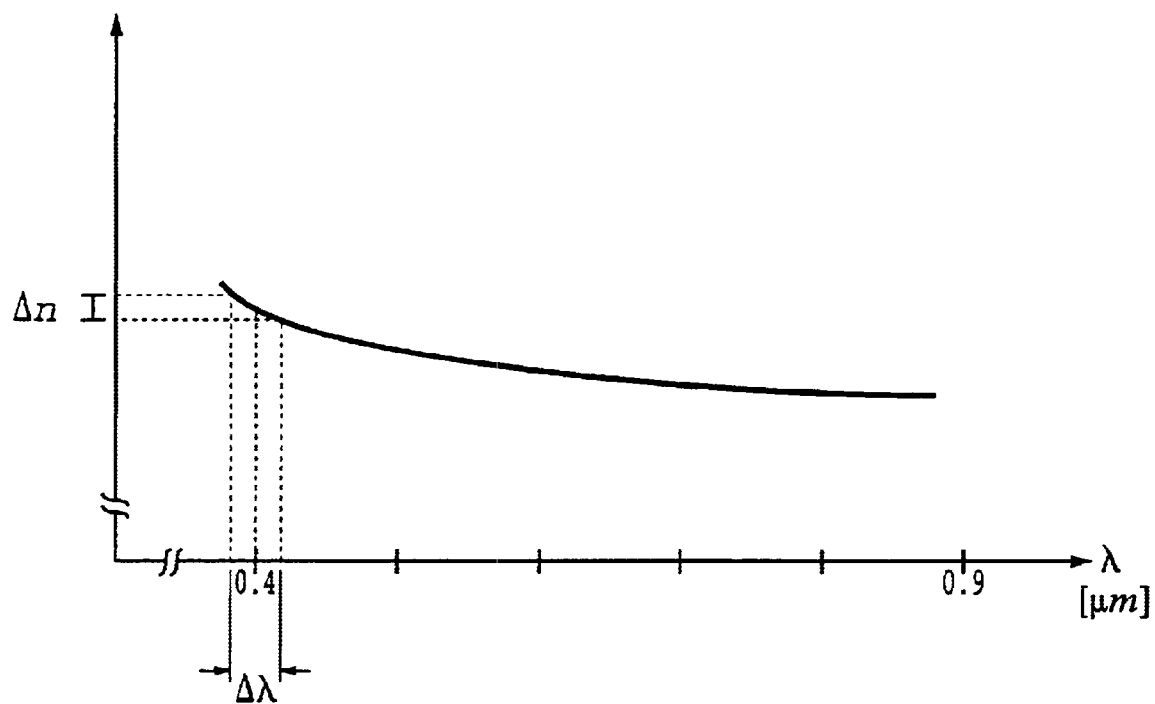
FIG. 3 shows in a schematic way the advantage of stabilizing the shorter-wavelength source of radiation.

FIG. 3 shows the physical facts leading to advantages of a stabilization of the short-wave radiation. Again the wavelength $\lambda$ is plotted on the horizontal axis, while the refractive index n is plotted on the vertical axis. The radiation emitted with a wavelength of 405 nm may on account of a number of effects, such as thermal effects, fluctuate around its nominal value within a range of $\Delta\lambda$ or drift away from it. The resulting variation $\Delta n$ of the refractive index attains values which, in view of the steep curve of the refractive index in the short-wave region, may attain the order of magnitude of the total difference found in a procedure of the prior art, and hence has a negative effect on the accuracy of the device. Therefore, a stabilization of the short-wave radiation will under certain conditions be a necessary prerequisite.

Figure 4:
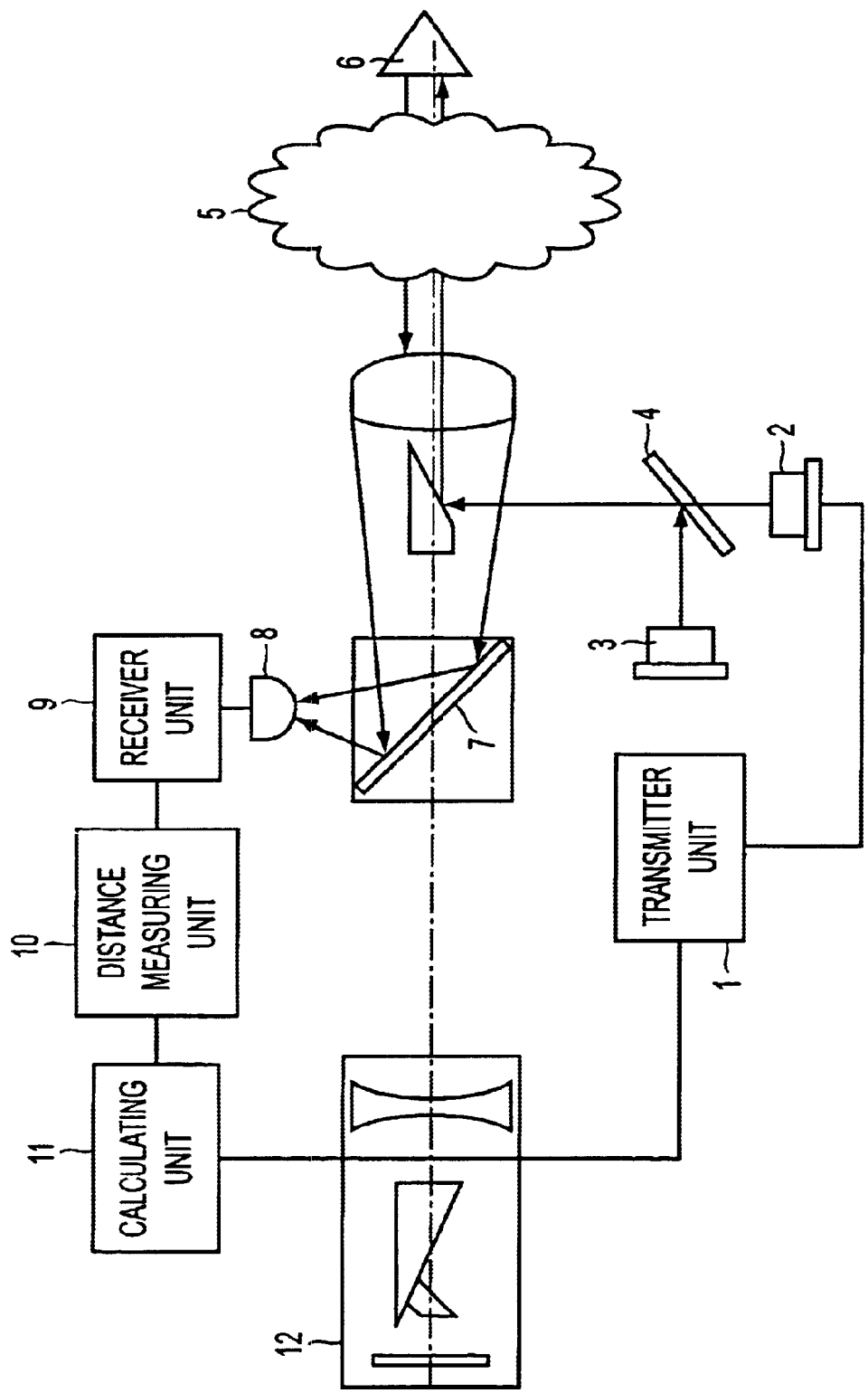
FIG. 4 shows in a schematic way the use of a device according to the invention in a theodolite telescope.

FIG. 4 shows as an example the realization of the device according to the invention in a theodolite telescope. A transmitter unit 1 controls a short-wave source of radiation 2 and a long-wave source of radiation 3, which thus emit electromagnetic radiation of two different carrier wavelengths. A beam splitter 4 brings the two carrier wavelenghts together, and the beams are then sent through the volume of atmosphere 5 to be probed, to a reflector 6. After their reflection, the radiation is sent via a splitting cube 7 to a receiver 8, is received there, and is electronically processed in a receiver unit 9. In the distance measuring unit 10 that follows, the distance being measured is calculated and corrected for the dispersive influence in a calculating unit 11. A visual telescope 12 is optionally used to align the theodolite.

Figure 5:
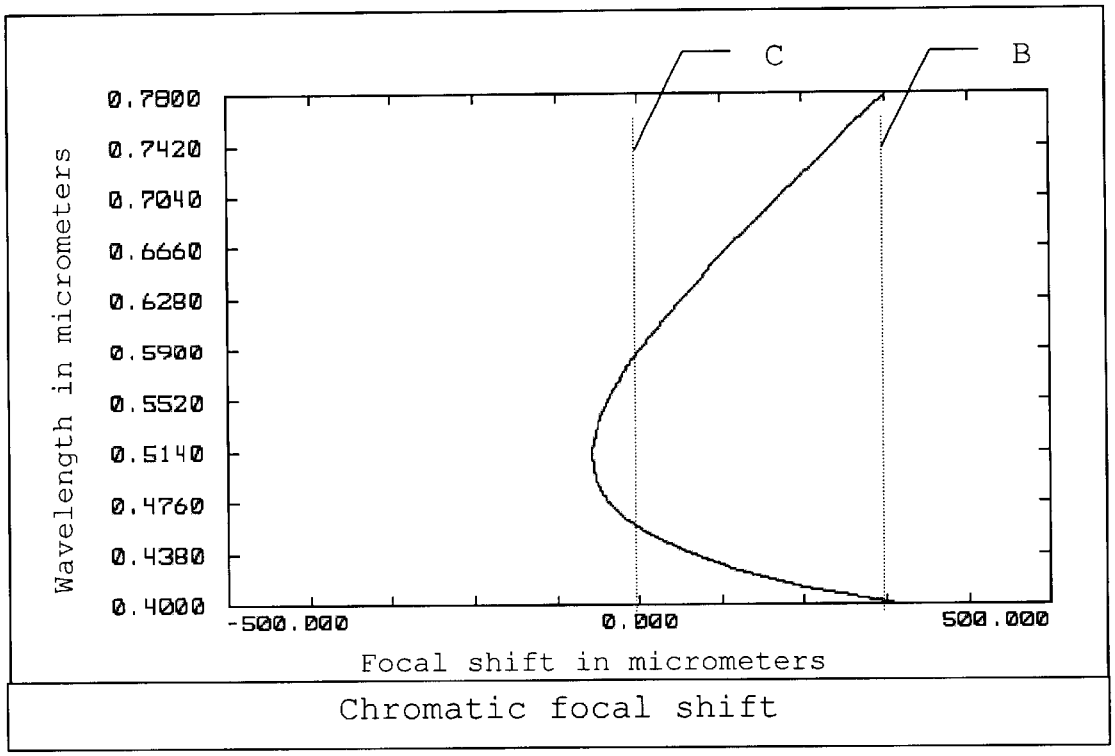
FIG. 5 shows the chromatic focal shift of optics for a device according to the invention.

FIG. 5 shows the curve of the chromatic focal shift for a common optics consisting of three lenses which by selection of the glass qualities have been spectroscopically optimized with respect to the two wavelengths used. The vertical axis indicates the wavelength of the electromagnetic radiation in micrometers, the horizontal axis indicates the focal shift in micrometers. Line B indicates the situation for two semiconductor lasers having their wavelengths in the violet region at 400 nm and in the red region at 780 nm. An identical focal shift occurs for these wave-lengths, so that a common imaging optics can be used. If instead of the violet semiconductor laser a blue-violet one was used, or instead of the red semiconductor laser, a green one was used, as shown for comparison by line C, then different focal shifts would arise for the two wavelengths, and different optics optimized for this new wavelength combination would have to be used. In view of similar shifts occurring at red and violet wavelengths, which are due to the typical shape of the curve of focal shifts, it is easier to produce common optics for these two wave-lengths.

Figure 6:
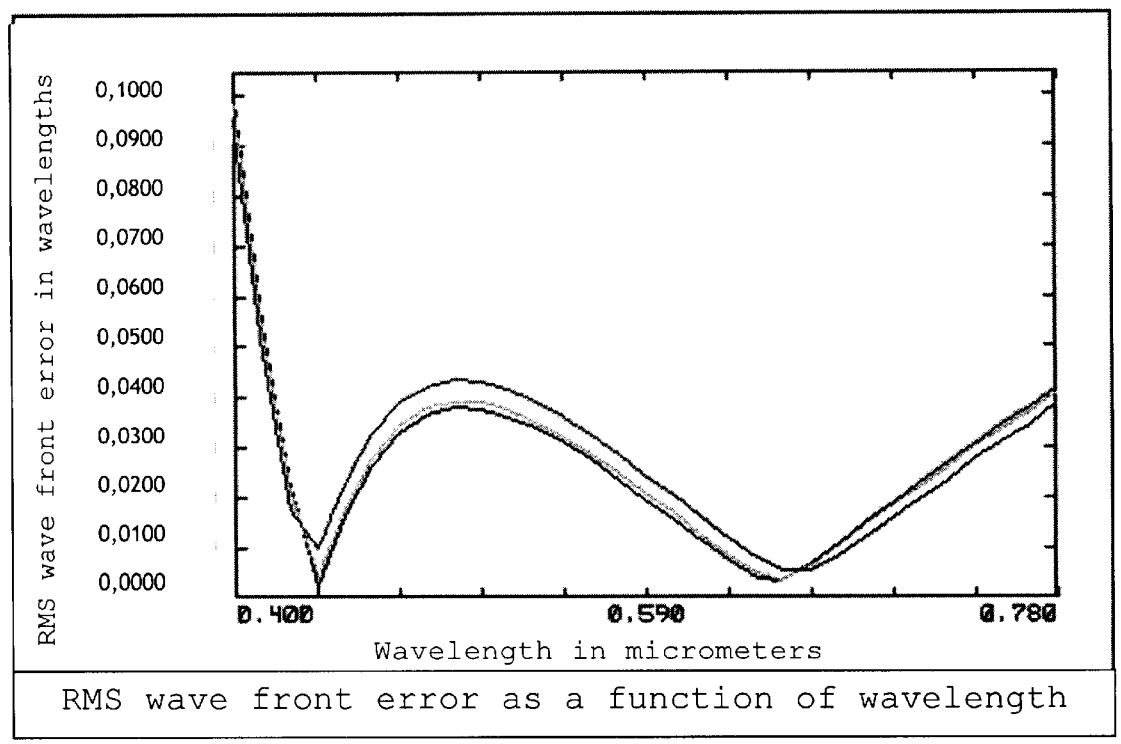
FIG. 6 shows the wave front error of optics for a device according to the invention.

The optical quality attainable with corresponding optics, that is, the image quality, is shown in FIG. 6. Plotted is the RMS (root-mean-square) wave front error against wavelength of the electromagnetic radiation for the three lenses. The horizontal axis indicates the wavelength in micrometers, while the vertical axis indicates the wave front error in units of wavelength. The RMS wave front error is a measure of quality of the corresponding lens.

The curves for the refractive index and for the brightness sensitivity of the human eye shown in FIGS. 1 to 3 should be understood to be merely qualitative. The differences such as $\Delta n$ and $\Delta \lambda$, explain the effects that appear in a qualitative way but cannot be used as a basis of quantitatively exact considerations.

It is to be understood that the figures presented represent one of many embodiments, and one skilled in the art will be able to derive alternative embodiments, for instance by using other means for emission or reception of the electromagnetic radiation or signal uptake or signal processing.

Listing of Reference Symbols

1 Emitter unit
2 Short-wave source of radiation
3 Long-wave source of radiation
4 Beam splitter
5 Volume of atmosphere
6 Reflector
7 Splitting cube
8 Receiver
9 Receiver unit
10 Distance measuring unit
11 Calculating unit
12 Visual telescope
A Brightness sensitivity
B Line
C Line

What is claimed is:

1. A device for determining the dispersive influence of a measurement, in particular a measurement of distance, along a path according to the principles of phase or pulse modulation, comprising:

means for emission of electromagnetic radiation with at least two carrier wavelengths, means for reception of the at least two carrier wavelengths, means for travel time measurements of the at least two different carrier wavelengths along the path, means for calculating the dispersive influence on the measurement from the at least two measured travel times, wherein the means for emission are so designed that they will at least, in the form of at least a first semiconductor laser, emit a first carrier wavelength in the infrared or red wavelength region, and in the form of at least a second semiconductor laser, emit a second carrier wavelength in the violet wavelength region.

2. The device according to claim 1, further comprising means to calculate a correction of the dispersive effects, for instance in distance measurements.

3. The device according to claim 1, wherein the second carrier wavelength is in the range from 390 nm to 420 nm or from 425 nm to 455 nm.

4. The device according to claim 1, wherein the first semiconductor laser and the second semi-conductor laser have an identical or common electronic controller.

5. The device according to claim 1, wherein the electromagnetic radiation of the second carrier wavelength is intensity-modulated with rise times at most in the nanosecond range, and preferably in the picosecond range.

6. The device according to claim 1, wherein the means for reception of electromagnetic radiation have a common optics for the at least two carrier wavelengths.

7. The device according to claim 1, wherein the means for reception of electromagnetic radiation have optics with reflective elements.

8. The device according to claim 1, wherein at least one carrier wavelength, particularly the second carrier wavelength, is stabilized, by one of a distributed feedback (DFB), distributed Bragg reflector (DBR), fibre Bragg grating (FBG), and Fabry-Perot etalon locking.

9. The device according to claim 1, wherein means to compensate, preferably by calculation, an influence of thermal drift of at least one carrier wavelength, particularly the second carrier wavelength, on the dispersive effect, or to avoid the drift, preferably by temperature regulation of the means for emission.

10. The device according to claim 1, wherein the device or at least one of the means is modularly conceived.

11. A use of a device according to claim 1 for correcting the influence on distance measurements resulting from dispersion.

12. A geodetic instrument, particularly a theodolite, wherein the instrument has a device for determining the dispersive influence according to claim 1.

* * * * *